United States Patent
Kubala et al.

(10) Patent No.: US 10,209,912 B2
(45) Date of Patent: *Feb. 19, 2019

(54) PRE-ALLOCATING SAVE AREAS OF A MEMORY

(71) Applicant: INTERNATIONAL BUSINESS MACHINES CORPORATION, Armonk, NY (US)

(72) Inventors: Jeffrey P. Kubala, Poughquag, NY (US); Jerry A. Moody, Beekman, NY (US); Muruganandam Somasundaram, Poughkeepsie, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/896,650

(22) Filed: Feb. 14, 2018

(65) Prior Publication Data

US 2018/0173446 A1    Jun. 21, 2018

Related U.S. Application Data

(63) Continuation of application No. 15/450,353, filed on Mar. 6, 2017, now Pat. No. 9,940,054, which is a continuation of application No. 15/274,521, filed on Sep. 23, 2016, now Pat. No. 9,678,865.

(51) Int. Cl.
| | |
|---|---|
| *G03F 3/06* | (2006.01) |
| *G06F 3/06* | (2006.01) |
| *G06F 12/02* | (2006.01) |
| *G06F 12/0842* | (2016.01) |
| *G06F 12/084* | (2016.01) |

(Continued)

(52) U.S. Cl.
CPC .......... *G06F 3/0631* (2013.01); *G06F 3/0604* (2013.01); *G06F 3/0673* (2013.01); *G06F 8/60* (2013.01); *G06F 9/4405* (2013.01); *G06F 12/0284* (2013.01); *G06F 12/084* (2013.01); *G06F 12/0842* (2013.01); *G06F 12/023* (2013.01); *G06F 2212/1016* (2013.01)

(58) Field of Classification Search
None
See application file for complete search history.

(56) References Cited

U.S. PATENT DOCUMENTS 9,678,865 B1    6/2017    Kubala et al.

OTHER PUBLICATIONS

Jeffrey P. Kubala et al., "Pre-Allocating Save Areas of a Memory", U.S. Appl. No. 15/450,353, filed Mar. 6, 2017.

(Continued)

*Primary Examiner* — Brian R Peugh
(74) *Attorney, Agent, or Firm* — Cantor Colburn LLP; Steven Chiu

(57) ABSTRACT

Examples of techniques for pre-allocating save areas of memory of a computer processing system are disclosed. In one example implementation according to aspects of the present disclosure, a computer-implemented method may include initiating, by a host processing device, a control program. The method may further include, responsive to initiating the control program, pre-allocating, by the host processing device, a plurality of save areas for each of a plurality of processors, wherein the plurality of save areas are anchored in a fixed area of the memory for each of the plurality of processors.

17 Claims, 5 Drawing Sheets

(51) Int. Cl.
*G06F 8/60* (2018.01)
*G06F 9/4401* (2018.01)

(56) References Cited

OTHER PUBLICATIONS

List of IBM Patents or Patent Application Treated as Related; Date Filed: Feb. 14, 2018, 2 pages.

PRE-ALLOCATING SAVE AREAS OF A MEMORY

DOMESTIC PRIORITY

This application is a continuation of U.S. patent application Ser. No. 15/450,353, now U.S. Pat. No. 9,940,054, entitled "PRE-ALLOCATING SAVE AREAS OF A MEMORY" filed Mar. 6, 2017, which is a continuation of U.S. patent application Ser. No. 15/274,521, now U.S. Pat. No. 9,678,865, entitled "PRE-ALLOCATING SAVE AREAS OF A MEMORY," filed Sep. 23, 2016, the disclosures of which are incorporated by reference herein in their entirety.

BACKGROUND

The present disclosure generally relates to computer processing systems and, more particularly, relates to pre-allocating save areas of memory of a computer processing system.

Save areas are used in legacy programming languages like Assembler and the PLX programming language provided by IBM®, to save register contents as control flows from one function to another. On entry to a function, a save area is allocated and register contents of the caller are saved in the save area. On exit from the function, the register contents are restored to the registers, the save area is freed, and control is returned back to the caller.

SUMMARY

According to examples of the present disclosure, techniques including methods, systems, and/or computer program products for pre-allocating save areas of memory of a computer processing system are provided. An example method may include initiating, by a host processing device, a control program. The method may further include, responsive to initiating the control program, pre-allocating, by the host processing device, a plurality of save areas for each of a plurality of processors, wherein the plurality of save areas are anchored in a fixed area of the memory for each of the plurality of processors.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Figure 1:
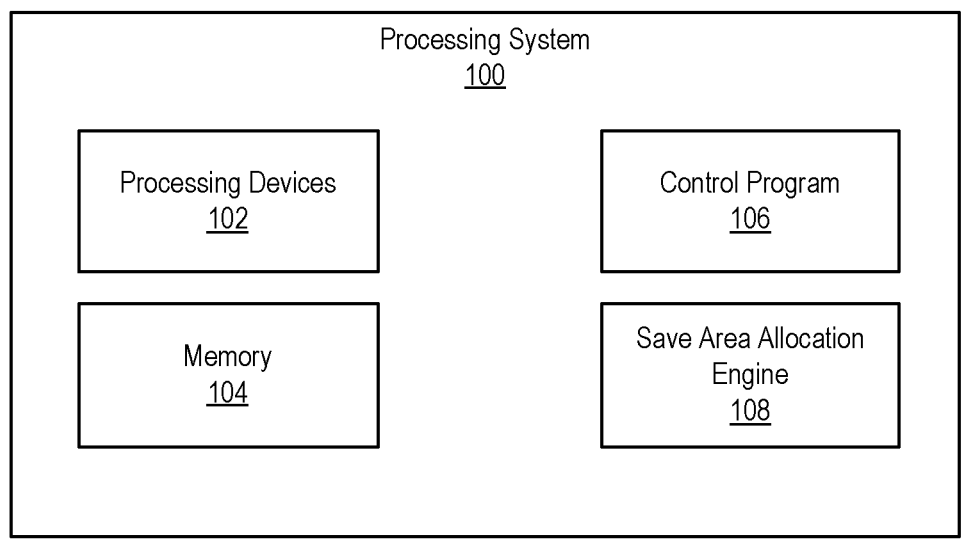
FIG. 1 illustrates a block diagram of a processing system for pre-allocating save areas of a memory the processing system according to examples of the present disclosure.

A control program (i.e., a program written to run on the bare metal to control system resources) written in a legacy programming language can strain internal memory allocation infrastructure. As control flows from one routine to another on a physical processor, a save area is allocated using the internal memory allocation routine and the save area is released as control exits out of the function.

The control program has another use case for the save area: In case one physical processor wants to schedule work on another physical processor, a save area is allocated, formatted with required data, and queued into the work queue of the other processor. Once the second processor finishes the work, it frees the save area. For example, if a processor A wants to schedule work to a processor B, processor A allocates a save area, places the input in the save area, and attaches this save area to the work queue of the processor B. Once processor B completes the work, processor B frees the save area.

Two primary issues arise with using save areas for the above two cases: memory fragmentation and performance degradation. When the control program wants to schedule a message to the rest of the processors on the system (which could be in 100s of processors), the control program allocates a save area for each of the processor, formats the message, and queues it to the respective processor's work queue. This causes a sudden burst of allocating 100s of save areas in a short time and causes performance bottlenecks. A save area size of 200 bytes, which is not a power of 2, also contributes to memory fragmentation. Many similar scenarios cause a sudden burst of save area allocation and deallocations, which causes the memory allocation infrastructure to be the bottleneck.

Various implementations are described below by referring to several examples of pre-allocating save areas. In particular, the present technique utilizes a plurality (e.g., 256) of pre-allocated save areas for each physical processor in a multi-processor processing system when the control program initiates. The plurality of save areas is anchored in a fixed area of memory for each processor. The fixed area is cache aligned and so is the save area.

Example embodiments of the disclosure include or yield various technical features, technical effects, and/or improvements to technology. Example embodiments of the disclosure provide techniques for pre-allocating save areas of a memory of a computer processing system. In particular, a control program is initiated and, responsive thereto, a plurality of save areas of each of a plurality of processors is pre-allocated. The plurality of save areas is anchored in a fixed area of the memory for each of the plurality of processors. These aspects of the disclosure constitute technical features that yield the technical effect of optimizing the usage of save areas by the control program for performance. By removing the performance bottleneck, the control program has a consistent performance, which was not true of previous approaches to save area allocation. Additionally, the host processor may never need to invoke the memory allocation infrastructure for allocation of save areas. In other words, the save areas, once allocated, are persistent until the control program is shut down and do not need to be reallocated. As a result of these technical features and technical effects, the present techniques for pre-allocating save areas described in the example embodiments of the present disclosure represents an improvement to existing save area allocation techniques. It should be appreciated that the above examples of technical features, technical effects, and improvements to the technology of example embodiments of the disclosure are merely illustrative and not exhaustive.

FIG. 1 illustrates a block diagram of a processing system 100 for pre-allocating save areas of a memory 104 the processing system 100 according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing devices 102 for executing those instructions. Thus a system memory 104 can store program instructions that when executed by the processors 102 implement the engines described herein. Other engines may also be utilized to include other features and functionality described in other examples herein.

Processing system 100 may include the processors 102, the memory 104, a control program 106, and a save area allocation engine 108. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

It should be appreciated that the processors 102 may include a plurality of processors. In some examples, the processors 102 include 256 physical processors, although other numbers of physical processors may also be implemented. The save area allocation engine 108 pre-allocates save areas for each of the processors 102 when the control program 106 initiates. That is, upon initiation of the control program, the save area allocation engine 108 pre-allocates save areas for each of the processors 102.

The save area allocation engine 108 pre-allocates the plurality of save areas such that the plurality of save areas are anchored in a fixed area of the memory 104 for each of the processors 102. The fixed area of the memory 104 is cache aligned to a cache for each of the processor 102 and so are the save areas.

Figure 2:
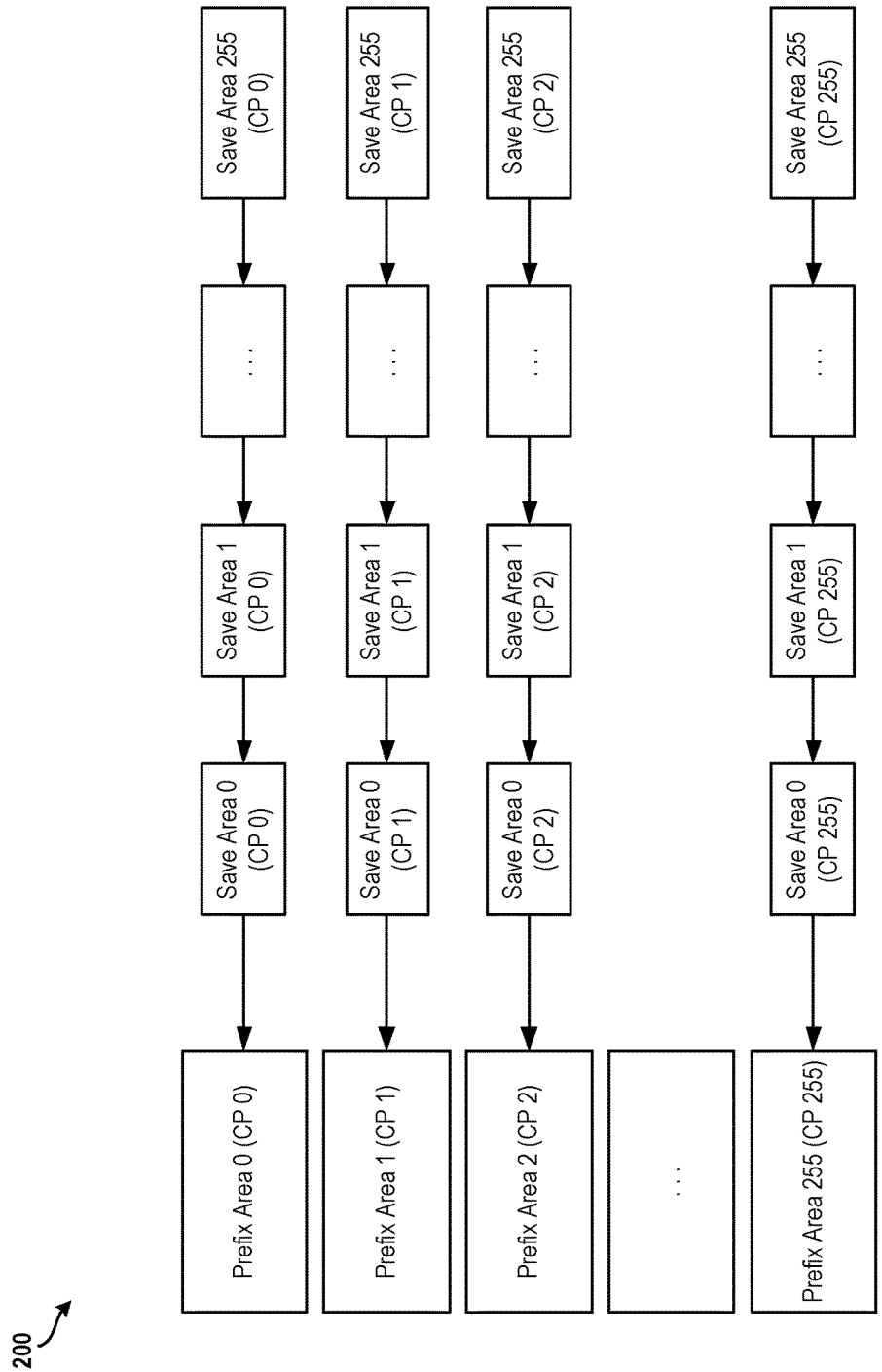
FIG. 2 illustrates a block diagram of a memory for a processing system having a plurality of pre-allocated save areas according to aspects of the present disclosure.

FIG. 2 illustrates a block diagram of a memory 200 for a processing system having a plurality of pre-allocated save areas according to aspects of the present disclosure. In particular, the memory 200 includes prefix areas for each of a plurality of processors (e.g., the processors 102 of FIG. 1). In the example of FIG. 2, the processing system includes 256 processors, although another suitable number of processors may be used. Each of the 256 processors includes a prefix area reserved in the memory. For example, prefix area 0 corresponds to processor 0. It should be appreciated that the processors are indicated "CP" in FIG. 2. Prefix area 1 corresponds to processor 1, prefix area 2 corresponds to processor 2, and prefix area 255 corresponds to processor 255, with other prefix areas corresponding to their respective processors. In other examples, the plurality of processors includes m processors and each of the m processors includes n save areas, where m and n are integers.

Each of the processors includes a plurality of save areas, designated save area 0, save area 1, and save area 255. In an example implementation of the present techniques, approximately 256 save areas of size 256 bytes are pre-allocated when the control program (e.g., the control program 106 of FIG. 1) initiates. The save areas are anchored in the prefix area for each processor. The host processor may never need to invoke the memory allocation infrastructure for allocation of save areas. In other words, the save areas, once allocated, are always present and do not need to be reallocated.

Figure 3:
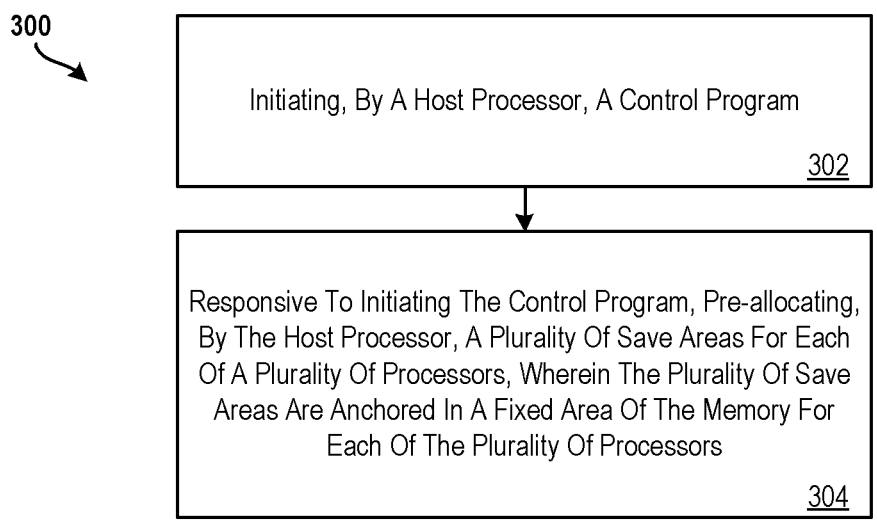
FIG. 3 illustrates a flow diagram of a method for pre-allocating save areas of a memory of a processing system according to examples of the present disclosure.

FIG. 3 illustrates a flow diagram of a method 300 for pre-allocating save areas of a memory of a processing system according to examples of the present disclosure. It should be appreciated that the method 300 may be performed by a processing system, such as the processing system 100 of FIG. 1, the processing system 20 of FIG. 5, or another suitable processing system.

At block 302, the method 300 comprises initiating, by a host processor, a control program. At block 304, the method 300 comprises, responsive to initiating the control program, pre-allocating, by the host processor, a plurality of save areas for each of a plurality of processors, wherein the plurality of save areas are anchored in a fixed area of the memory for each of the plurality of processors.

It should be appreciated that a memory allocation infrastructure for allocation of save areas need not be invoked by the host processor after the pre-allocating. This increases the efficiency and speed of the processing system and reduces fragmentation of the memory.

In some examples, each of the plurality of save areas for one of the plurality of processors is the same size. A size of each of the plurality of save areas may be a size in bytes that is a power of two (e.g., 2, 4, 8, 16, 32, etc.). In some examples, the size of each of the plurality of save areas is 256 bytes. In some examples, the size of each of the plurality of save areas is equal to a cache line of a cache memory of the plurality of processors. According to aspects of the present disclosure, the plurality of processors may comprise 256 processors and each of the processors may comprise 256 save areas pre-allocated thereto.

Additional processes also may be included, and it should be understood that the processes depicted in FIG. 3 represent illustrations, and that other processes may be added or existing processes may be removed, modified, or rearranged without departing from the scope and spirit of the present disclosure.

Figure 4:
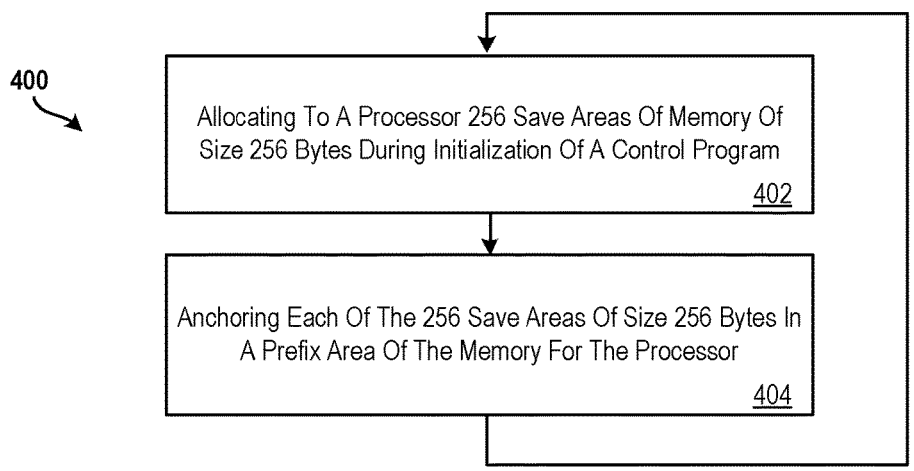
FIG. 4 illustrates a flow diagram of a method for pre-allocating save areas of a memory of a processing system according to examples of the present disclosure.

FIG. 4 illustrates a flow diagram of a method 400 for pre-allocating save areas of a memory of a processing system according to examples of the present disclosure. It should be appreciated that the method 400 may be performed by a processing system, such as the processing system 100 of FIG. 1, the processing system 20 of FIG. 5, or another suitable processing system.

At block 402, the method 400 comprises allocating to a processor 256 save areas of memory of size 256 bytes during initialization of a control program. For example, a single buffer is allocated during initialization of the control program of size 256*256*256 bytes i.e. 256 save areas, each of size 256 bytes for each of the 256 processors. Once the buffer is allocated, it is broken into 256*256 save areas, metadata is added, and a linked list (illustrated in FIG. 2) is generated. At block 404, the method 400 comprises anchoring each of the 256 save areas of size 256 bytes in a prefix area of the memory for the processor. The method 400 may be repeated for each of a plurality of processors in the processing system.

Although the method 400 describes 256 save areas of size 256 bytes, other numbers of save areas and other sizes of save areas are possible as discussed herein.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
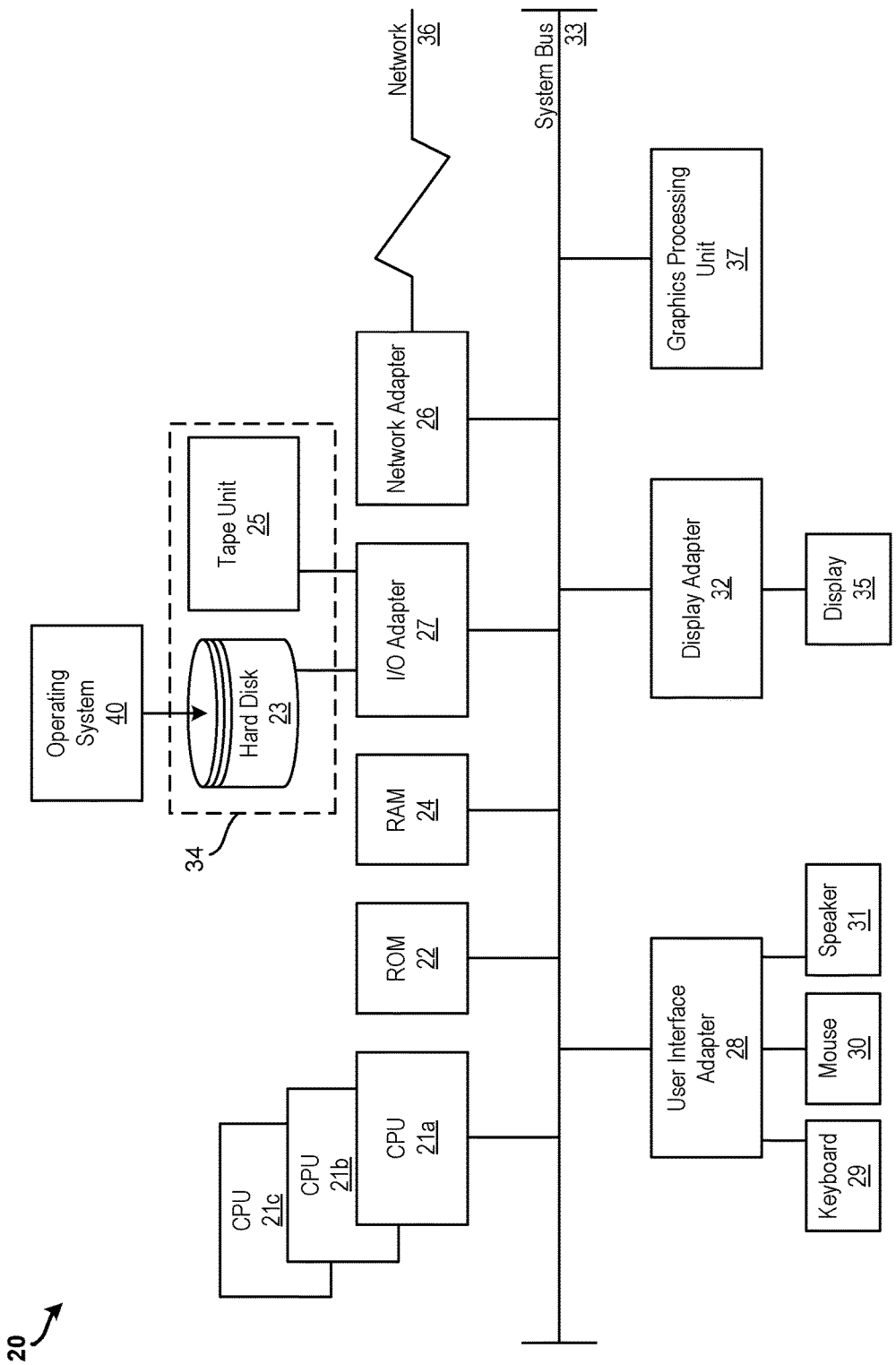
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for pre-allocating save areas of a memory of a computer processing system, the method comprising:
    initiating, by a host processing device, a control program; and
    responsive to initiating the control program, pre-allocating, by the host processing device, a plurality of save areas for each of a plurality of processors, wherein the plurality of save areas are anchored in a fixed area of the memory for each of the plurality of processors, wherein the plurality of processors comprises N processors, and wherein each of the plurality of processors comprises N save areas pre-allocated thereto.

2. The computer-implemented method of claim 1, wherein each of the plurality of save areas for each of the plurality of processors have a size that is equal.

3. The computer-implemented method of claim 1, wherein a size of each of the plurality of save areas is a size in bytes that is a power of two.

4. The computer-implemented method of claim 1, wherein a size of each of the plurality of save areas is 256 bytes.

5. The computer-implemented method of claim 1, wherein a size of each of the plurality of save areas is a size equal to a multiple of a cache line of a cache memory of the plurality of processors.

6. The computer-implemented method of claim 1, wherein the plurality of processors comprises 256 processors and wherein each of the plurality of processors comprises 256 save areas pre-allocated thereto.

7. The computer-implemented method of claim 1, wherein the plurality of processors comprises m processors and wherein each of the m processors comprises n save areas, where m and n are greater than zero.

8. A computer processing system for pre-allocating save areas of a memory of the computer processing system, the system comprising:
    a host processing device for executing computer readable instructions stored on the memory, the computer readable instructions executable to perform a method comprising:
        initiating, by the host processing device, a control program; and
        responsive to initiating the control program, pre-allocating, by the host processing device, a plurality of save areas for each of a plurality of processors, wherein the plurality of save areas are anchored in a fixed area of the memory for each of the plurality of processors, wherein the plurality of processors comprises N processors, and wherein each of the plurality of processors comprises N save areas pre-allocated thereto.

9. The computer processing system of claim 8, wherein each of the plurality of save areas for each of the plurality of processors have a size that is equal.

10. The computer processing system of claim 8, wherein a size of each of the plurality of save areas is a size in bytes that is a power of two.

11. The computer processing system of claim 8, wherein a size of each of the plurality of save areas is 256 bytes.

12. The computer processing system of claim 8, wherein a size of each of the plurality of save areas is a size equal to a multiple of a cache line of a cache memory of the plurality of processors.

13. The computer processing system of claim 8, wherein the plurality of processors comprises 256 processors and wherein each of the plurality of processors comprises 256 save areas pre-allocated thereto.

14. The computer processing system of claim 8, wherein the plurality of processors comprises m processors and wherein each of the m processors comprises n save areas, where m and n are greater than zero.

15. A computer program product for pre-allocating save areas of memory of a computer processing system, the computer program product comprising:
 a computer readable storage medium having program instructions embodied therewith, the program instructions executable by a host processing device to cause the processing device to perform a method comprising:
  initiating, by the host processing device, a control program; and
  responsive to initiating the control program, pre-allocating, by the host processing device, a plurality of save areas for each of a plurality of processors, wherein the plurality of save areas are anchored in a fixed area of the memory for each of the plurality of processors, wherein the plurality of processors comprises N processors, and wherein each of the plurality of processors comprises N save areas pre-allocated thereto.

16. The computer program product of claim 15, wherein each of the plurality of save areas for each of the plurality of processors have a size that is equal.

17. The computer program product of claim 15, wherein the plurality of processors comprises m processors and wherein each of the m processors comprises n save areas, where m and n are greater than zero.

* * * * *